(12) United States Patent
Liberty

(10) Patent No.: US 6,768,860 B2
(45) Date of Patent: Jul. 27, 2004

(54) HIGH DENSITY FIBER OPTIC MODULE

(75) Inventor: Jonathan Liberty, Ottawa (CA)

(73) Assignee: JDS Uniphase Inc., Ottawa (CA)

( * ) Notice: Subject to any disclaimer, the term of this patent is extended or adjusted under 35 U.S.C. 154(b) by 0 days.

(21) Appl. No.: 10/310,071

(22) Filed: Dec. 5, 2002

(65) Prior Publication Data

US 2004/0109660 A1 Jun. 10, 2004

(51) Int. Cl.[7] .................................................. G02B 6/00
(52) U.S. Cl. ........................................ 385/135; 439/562
(58) Field of Search ................................ 385/135, 134, 385/136, 137; 439/562, 564, 565, 954, 536

(56) References Cited

U.S. PATENT DOCUMENTS

| 1,768,422 | A | * | 6/1930 | Russel et al. ............... 439/545 |
| 4,708,430 | A | | 11/1987 | Donaldson et al. ......... 385/134 |
| 4,824,196 | A | | 4/1989 | Bylander .................... 385/134 |
| 4,898,448 | A | | 2/1990 | Cooper ........................ 385/92 |
| 5,129,030 | A | | 7/1992 | Petrunia .................... 385/135 |
| 5,212,761 | A | | 5/1993 | Petrunia .................... 385/135 |
| 6,208,796 | B1 | | 3/2001 | Williams Vigliaturo ..... 385/135 |
| 6,259,850 | B1 | * | 7/2001 | Crosby et al. ............... 385/134 |
| 6,435,727 | B1 | * | 8/2002 | Fingler et al. ................ 385/53 |
| 6,568,861 | B2 | * | 5/2003 | Benner et al. ................ 385/55 |
| 6,582,132 | B1 | * | 6/2003 | Farnsworth et al. .......... 385/53 |
| 6,623,170 | B2 | * | 9/2003 | Petrillo ........................ 385/53 |

* cited by examiner

Primary Examiner—Tulsidas C. Patel
(74) Attorney, Agent, or Firm—Teitelbaum & MacLean; Doug MacLean

(57) ABSTRACT

The invention relates to replaceable modules for use in optical fiber distribution racks. The modules according to the present invention are mounted in the distribution rack at a slight angle, which enables a simple and effective latching mechanism to connect and disconnect the module therefrom using one hand. Moreover, a preferred embodiment of the present invention minimizes the required size of the module by positioning the input ports at an angle to the remainder of the module body, which has the added benefit of directing the attached cables away from the latching mechanism providing enfettered access thereto. The optical fiber distribution rack according to the present invention includes a sliding lower tray with a sliding upper frame member, whereby full access to both the tray and the frame member are provided.

19 Claims, 5 Drawing Sheets

HIGH DENSITY FIBER OPTIC MODULE

CROSS-REFERENCE TO RELATED APPLICATIONS

This application is the first filed for the present invention.

TECHNICAL FIELD

The present invention relates to a fiber optic module, and in particular to a high density fiber optic module for mounting fiber optic components in a distribution rack.

BACKGROUND OF THE INVENTION

The use of modular fiber optic distribution racks for cable management and storage is prevalent in the telecommunications industry because they provide easy access to the fiber optic cables for maintenance, upgrading, monitoring, rerouting and replacement. Conventional distribution racks, such as those disclosed in U.S. Pat. No. 5,129,030 issued Jul. 7, 1992 in the name of Alexander Petrunia and U.S. Pat. No. 6,208,796 issued Mar. 27, 2001 in the name of Shari Vigliaturo, include a series of slots with opposed mounting flanges used to mount modular cassettes therein.

Various attempts have been made to facilitate access to the modules, while maintaining or enhancing fiber management and strain relief techniques. U.S. Pat. No. 4,708,430 issued Nov. 24, 1987 to Michael Donaldson discloses a module with a fixed hinge on one side, while U.S. Pat. No. 4,898,448 issued Feb. 6, 1990 discloses a distribution rack with a sliding drawer to facilitate access to the optical fibers. Unfortunately, both of these systems require the permanent attachment of the modules to the rack, which greatly limits the versatility of the device. One of the most common means for mounting the modular cassettes to the racks is disclosed in U.S. Pat. No. 5,212,761 issued May 18, 1993 to Alexander Petrunia, and involves the use of two mechanical fasteners, e.g. snap fastener, one for each mounting flange, which enable the cassette to be completely removed from the rack. Unfortunately, this system requires the use of both hands to operate, and typically necessitates the bending of the attached cables to gain access to both fasteners on opposite sides of the module. The repeated bending of the cables causes strain on the connectors leading to optical misalignment and decreased performance.

An object of the present invention is overcome the shortcomings of the prior art by providing a removable modular cassette, which is relatively easy to remove without damaging the optical cables extending therefrom.

SUMMARY OF THE INVENTION

Accordingly, the present invention relates to a module for use with a optical fiber distribution rack, of the type including first and second mounting flanges on opposite sides of an open slot.

The optical fiber distribution rack comprises: a body for enclosing optical components; and a faceplate comprising first and second connector tabs disposed on opposite sides of the body for engaging the first and second mounting flanges, respectively.

The first connector tab abuts against the first mounting flange. The second connector tab includes a notch for engaging the second mounting flange, whereby the body is suspended in die rack at a non-normal angle to a plane containing the first and second mounting flanges.

fastener is disposed on the first or the second connector tab for connecting the module to and disconnecting the module from the first or the second mounting flange, respectively.

An access port is mounted on the body between the first and second connector tabs for receiving at least one optical cable.

Another aspect of the present invention relates to an optical fiber distribution rack comprising: a housing for supporting optical fiber management systems; first and second mounting flanges on opposite sides of an open slot disposed in the housing; and a module.

The module comprises: a body for enclosing optical components;

a faceplate comprising first and second connector tabs disposed on opposite sides of the body for engaging the first and second mounting flanges, respectively, the first connector tab abutting against the first mounting flange, the second connector tab including a notch for engaging the second mounting flange, whereby the body is suspended in the rack at an angle to an axis normal to a plane containing the first and second mounting flanges;

a fastener disposed on the first or the second connector tab for connecting the module to and disconnecting the module from the first or the second mounting flange, respectively; and an access port mounted on the body between the first and second connector tabs for receiving at least one optical cable.

BRIEF DESCRIPTION OF THE DRAWINGS

The invention will be described in greater detail with reference to the accompanying drawings which represent preferred embodiments thereof, wherein.

DETAILED DESCRIPTION

Figure 1:
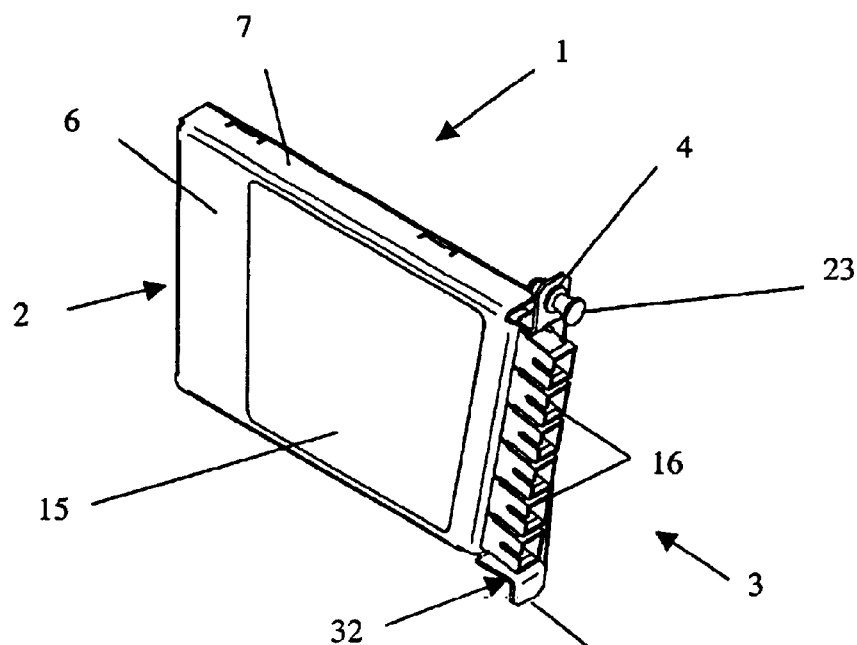
FIG. 1 is an isometric view of a fiber optic module according to present invention.
Figure 2:
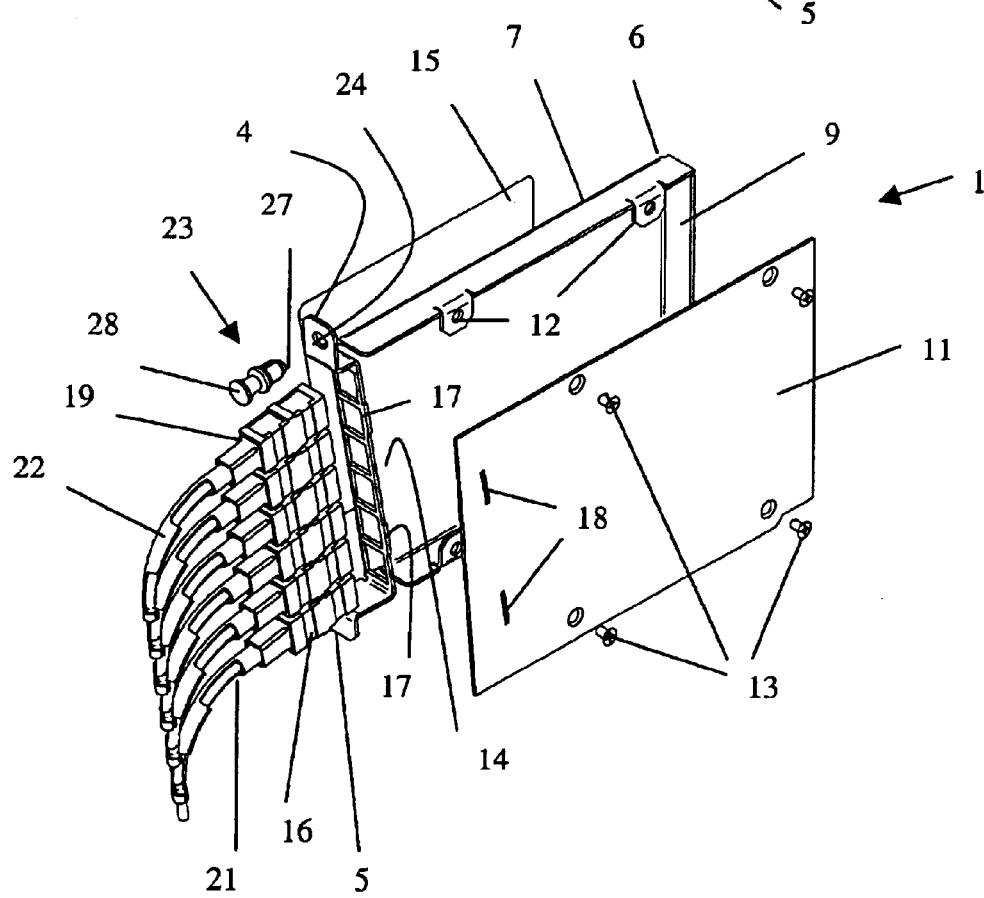
FIG. 2 is an exploded view of the fiber optic module of FIG. 1.
Figure 3:
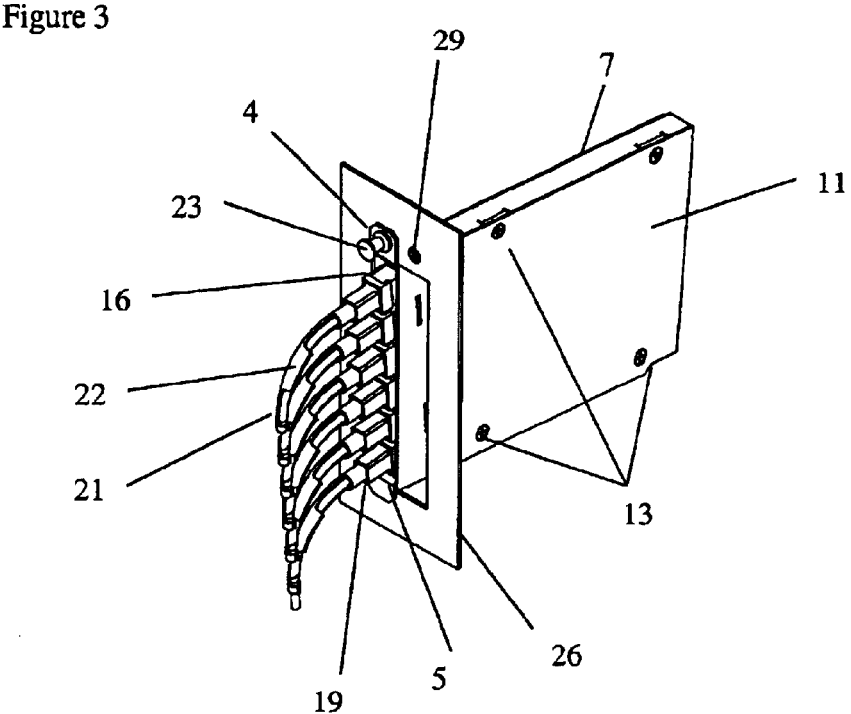
FIG. 3 is an isometric view of the fiber optic module of FIG. 1 mounted on a mounting flange.
Figure 4:
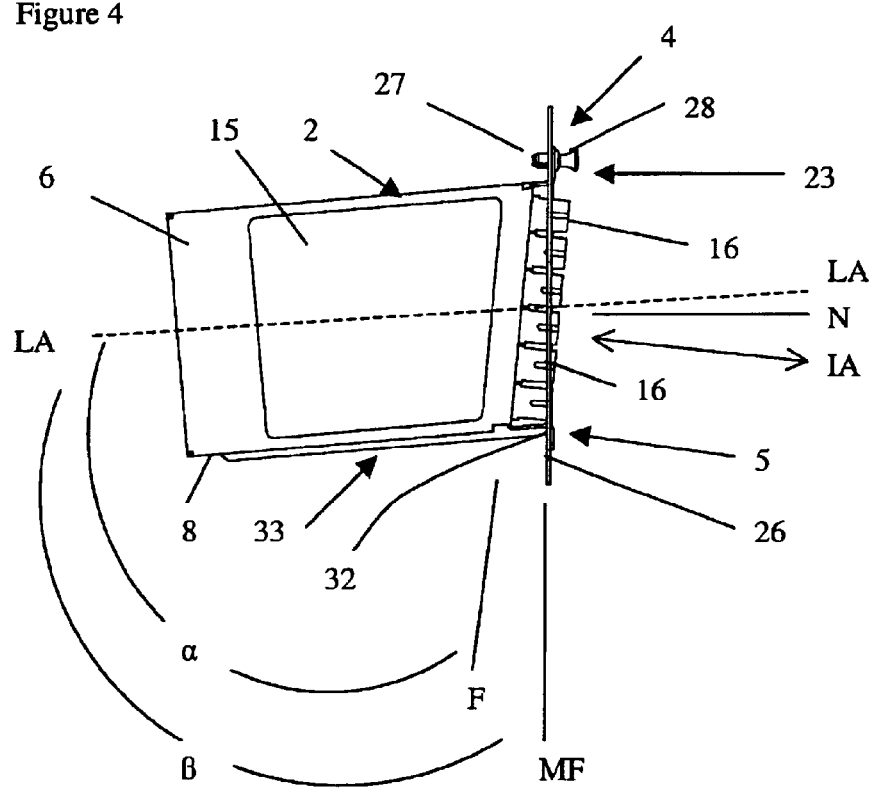
FIG. 4 is a side view of the fiber optic module of FIG. 3.

With reference to FIGS. 1 to 4, a fiber optic module according to the present invention, generally indicated at 1, includes a housing body 2, an access port 3, and a mounting faceplate comprised of connector tabs 4 and 5. The housing body 2 is comprised of a main portion 6 formed from a single piece of metal bent to form two parallel sides 7 and 8 with an end portion 9 perpendicular thereto. The housing 2 is defined by a longitudinal major axis LA (FIG. 4). A cover 11 is attached to ear flaps 12, which extend from the sides 7 and 8, using threaded fasteners 13. An information plate 15 providing details of the fiber optic module 1 is attached to the housing 2 with any suitable adhesive.

The access port 3 includes a frame member 14 (FIG. 2) for receiving six optical feed-through connectors 16. The frame member 14 is disposed along a plane designated F, which is at a non-normal angle relative to the major axis LA and is non parallel to the plane MF containing the connector tabs 4 and 5 for reasons that will be discussed below. Raised portions 17 are provided on the frame member 14 for insertion into alignment slots 18 on the cover 11 for facilitating the assembly process. Typically, the feed-through connectors 16 receive conventional SC optical connectors 19 mounted on the ends of optical fibers 21; however, any suitable connector can be accommodated. Strain relief sleeves 22 are provided to direct the optical fibers 21 in a desired direction, while maintaining the appropriate bend radius.

Figure 9:
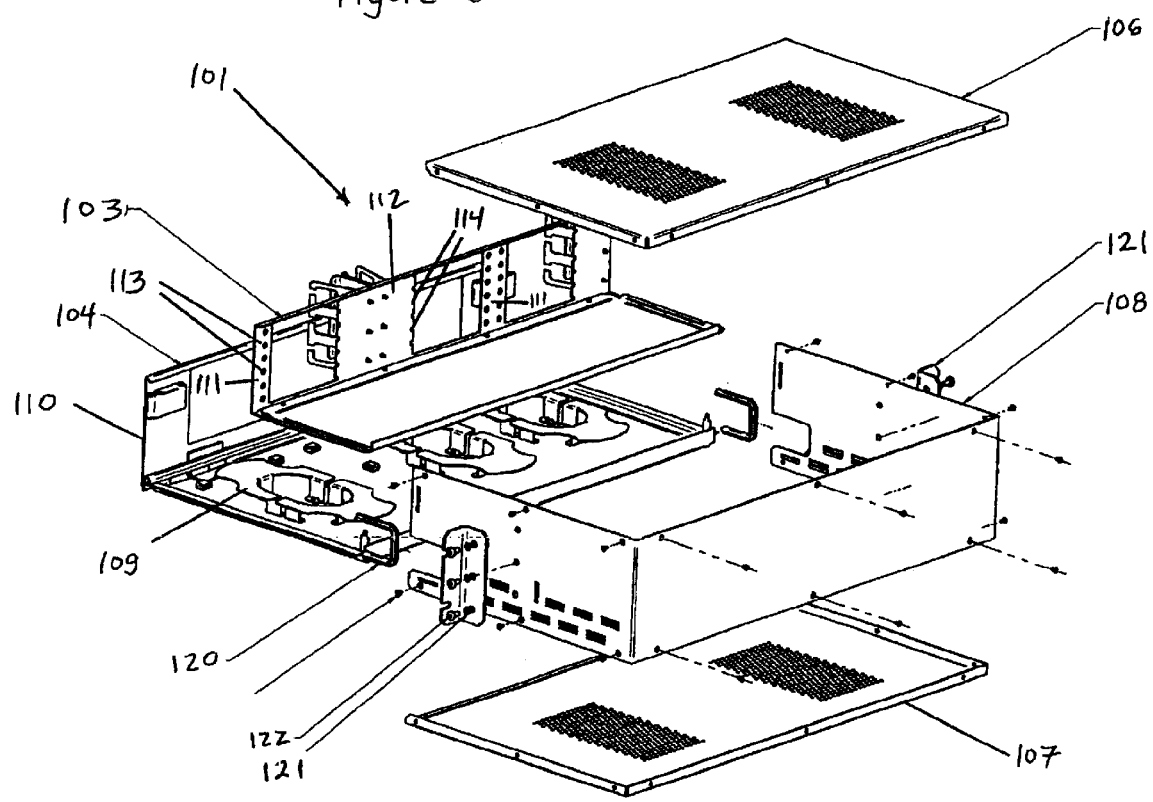
FIG. 9 is an exploded view of a distribution rack according to the present invention.

A mechanical fastener 23 extends through a hole 24 in the mounting tab 4 for locking the optical module 1 to a mounting flange 26 (see FIGS. 3 to 5) of a distribution rack (see FIG. 9). Preferably the mechanical fastener 23 is in the form of a plunger connector, which includes a split sleeve 27 that is held in an expanded position using a plunger 28 for frictionally engaging the recess 29 in the mounting flange 26.

FIG. 4 more clearly illustrates the angular relationship between the frame member 14 in the plane F, the connector tabs 4 and 5 in the plane MF, and the major axis LA of the module 1. The major axis LA is disposed at an angle α, e.g. 75° to 80°, from the plane F, While the connector tabs 4 and 5 are at an angle β, e.g. 80° to 85°, therefrom. The frame member 14 is positioned at the angle α to enable a larger number of optical feed-through connectors 16 to fit in the access port 3 than might otherwise if they were positioned normally. Moreover, the angle α ensures that the optical fibers that enter the housing 2 along an insertion direction IA, which is perpendicular to plane F, are initially directed to one side of the housing 2 into cable management devices, which alleviates possible bending stresses caused by abrupt direction changes. Furthermore, the optical fibers entering along the insertion direction IA are naturally directed away from the mechanical fastener 23, thereby eliminating the need to manually bend the fibers to gain access to the mechanical fastener 23. The direction IA is non-parallel to an axis N, which designates an axis normal to the plane MF.

The faceplate, i.e. the connector tabs 4 and 5, is disposed at an angle β, e.g. 80° to 85°, relative to the major axis LA to provide a means by which the module 1 can be connected to the mounting flange 26 with a single mechanical connector 23. As a result of this alignment, the connector tab 5 and the side 8 of the housing 2, which also define the acute angle β therebetween, form a notch 32 for receiving an edge of the mounting flange 26. This relationship enables the edge of the mounting flange 26 to be effectively held in the notch 32 when the module 1 is properly positioned in the rack.

Figure 5:
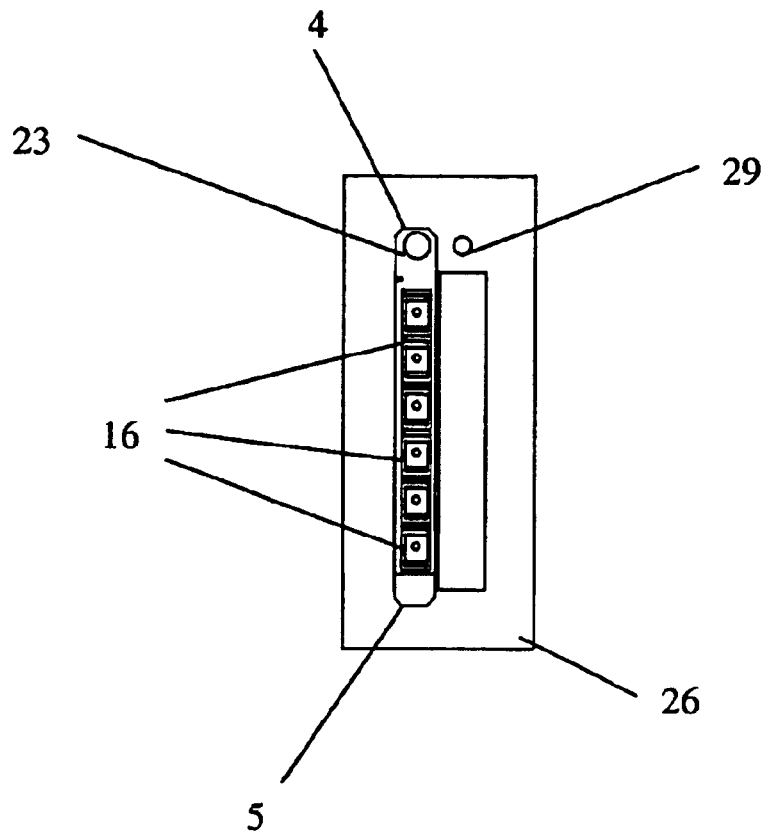
FIG. 5 is a front view of the fiber optic module of FIGS. 3 and 4 mounted vertically.
Figure 6:
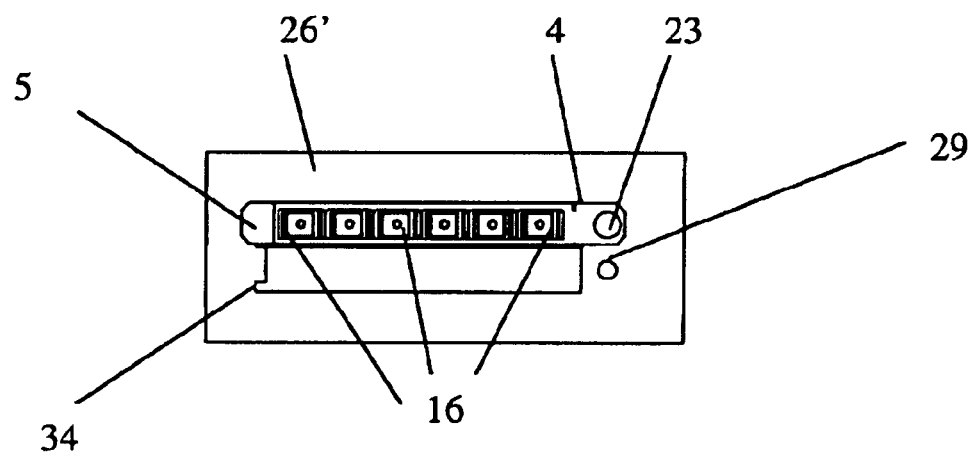
FIG. 6 is a front view of the fiber optic module of FIGS. 3 and 4 mounted horizontally.

When the module is mounted vertically, as in FIG. 5, gravity helps maintain the edge of the mounting flange 26 within the notch 32. However, as best seen in FIG. 6, when the module is mounted horizontally gravity acts to dislodge the module 1 from the notch 32. Accordingly, to prevent horizontally positioned modules 1 from slipping out of place, the cover 11 is manufactured slightly wider than the main portion 6 forming a lip 33 (FIG. 4). Furthermore, for horizontal applications, a groove 34 (FIG. 6) is provided in the mounting flange 26' for receiving the lip 33, thereby preventing the mounting flange 26' from slipping out of the notch 32.

Figure 7:
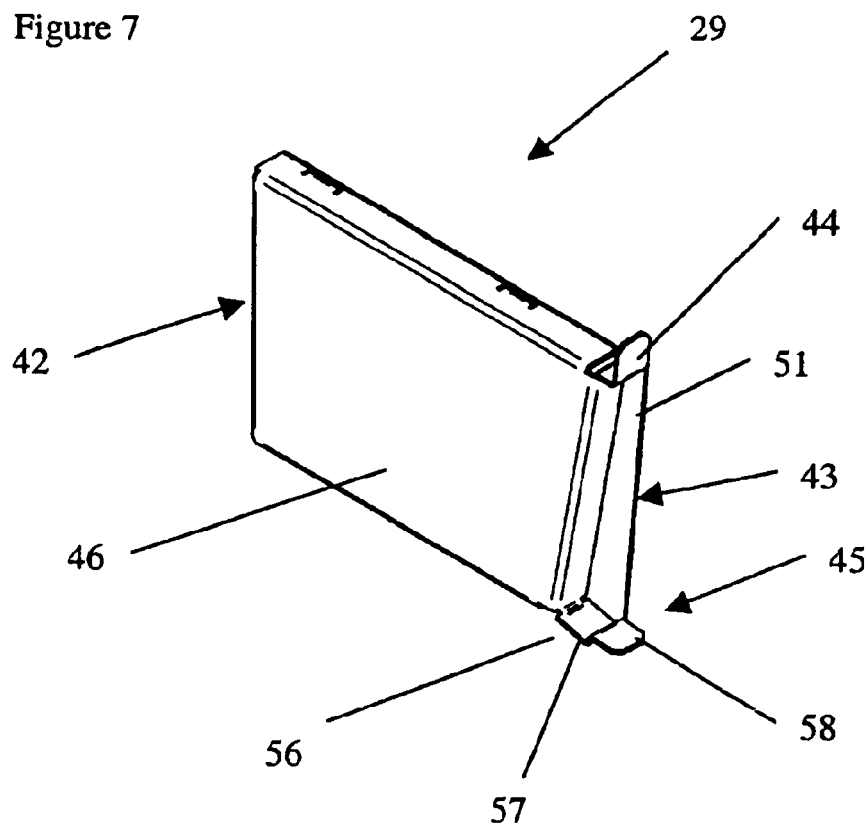
FIG. 7 is an isometric view of another embodiment of a fiber optic module according to the present invention.
Figure 8:
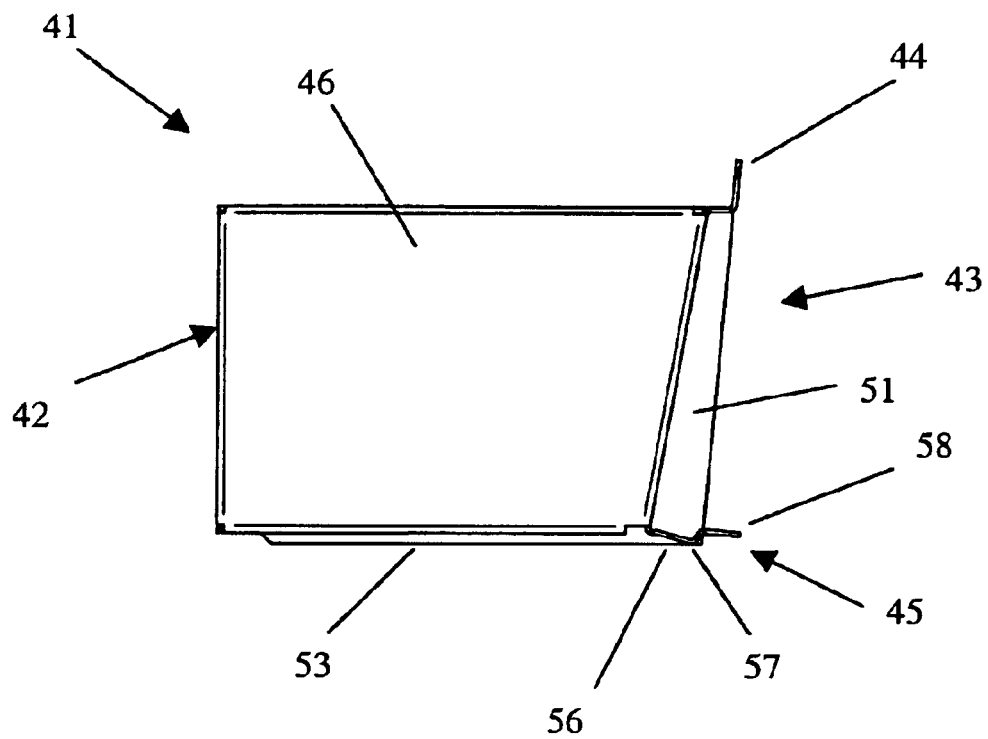
FIG. 8 is a side view of the fiber optic module of FIG. 7

Another embodiment of the mounting faceplate according to the present invention is illustrated in FIGS. 7 and 8. The details of the access port have been omitted for simplicity. Similar to the module 1, a module 41 includes a housing body 42 with an access port 43. A faceplate is provided comprising connector tabs 44 and 45 mounted on opposite sides of the access port 43. The housing 42 is comprised of a main portion 46 and a cover 51. The cover 51 is somewhat larger than the main portion 46 forming a lip 53 along one edge of the housing 42 for reasons that have been hereinbefore described. In this embodiment the connector tab 44 abuts against a mounting flange of a rack, while the connector tab 45 fastens the module 41 in place. The connector tab 45 is constructed from a resilient material, and includes a camming surface 56, which engages the mounting flange of a rack and displaces the connector tab 45 away from the mounting flange. The edge of the mounting flange slides along the camming surface until meeting a notch 57, at which point the connector tab 45 is biased back towards the mounting flange locking the mounting flange in the notch 57. A manually engaging portion 58 is provided on the connector tab 45 for facilitating engagement/disengagement of the connector tab 45 from the mounting flange.

Figure 10:
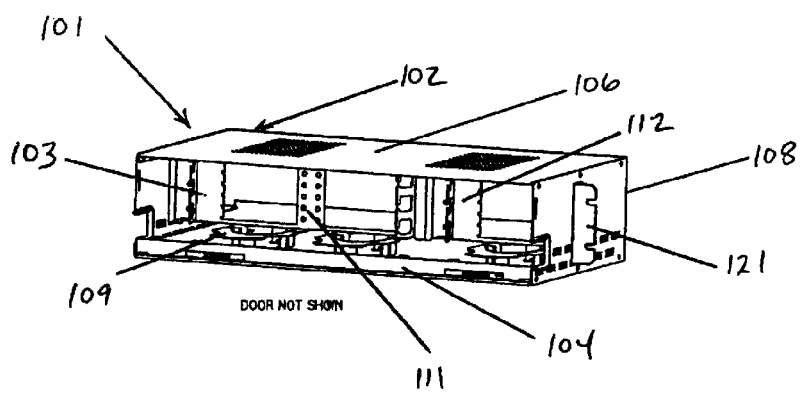
FIG. 10 is an isometric view of the distribution rack of FIG. 9 without a front door.

A preferred distribution rack 101 is illustrated in FIGS. 9 and 10, and includes an outer housing 102, a frame 103, and a tray 104. The outer housing 102 includes a planar cover 106, a planar base 107, and a C-shaped structure 108 forming the side and rear walls. The tray 104 is slideable into and out of the open front of the housing 102, and includes a plurality of fiber management reels 109 and a door 110 (not shown in FIG. 10). The frame 103 is slideable on the tray 104, and includes three openings defined by first and second mounting flanges 111 and 112, respectively. The first mounting flanges 111 include holes 113 for receiving the mechanical connectors 23 from modules. Grooves 114 are provided in the second mounting flange 112 for receiving the lips 33 of modules as hereinbefore described. In use, the tray 104 is initially moved forward independent of the frame 103 until reaching an abutment position, at which point further movement of the tray 104 causes the frame 103 to move simultaneously therewith, thereby providing full access to both the tray 104 and the frame 103. Side access ports, defined by C-shaped framing members 120 are provided to enable cables to pass in and out of the housing 102. Mounting brackets 121, connected to the housing 102 by screw fasteners 122, are provided for mounting a plurality of distribution racks 101 in a larger array (not shown).

I claim:

1. A module for use with a optical fiber distribution rack, which includes first and second mounting flanges, each defining an edge and an outside surface on opposite sides of an open slot, comprising:

a body for enclosing optical components;

a faceplate comprising first and second connector tabs disposed on opposite sides of the body for engaging the first and second mounting flanges, respectively, the first connector tab abutting against the outside surface of the first mounting flange, the second connector tab including a notch for engaging the edge of the second mounting flange, whereby the body is suspended in the rack at an acute angle to a plane containing the first and second mounting flanges;

a fastener disposed on the first or the second connector tab manually engageable from outside of the rack for connecting the module to and disconnecting the module from the first or the second mounting flange, respectively, with one hand; and an access port mounted on the body between the first and second connector tabs for receiving at least one optical cable.

2. The module according to claim 1, wherein the fastener is disposed on the first connector tab.

3. The module according to claim 2, wherein the second connector tab includes first and second planar sections defining an acute angle therebetween, whereby the notch is formed at a joint between the first and second planar sections.

4. A module for use with a optical fiber distribution rack, which includes first and second mounting flanges on opposite sides of an open slot, comprising:

a body for enclosing optical components;

a faceplate comprising first and second connector tabs disposed on opposite sides of the body for engaging the first and second mounting flanges, respectively, the first connector tab abutting against the first mounting flange, the second connector tab including a notch for engaging the second mounting flange, whereby the body is suspended in the rack at an acute angle to a plane containing the first and second mounting flanges;

a fastener disposed on the first or the second connector tab for connecting the module to and disconnecting the module from the first or the second mounting flange, respectively with one hand; and an access port mounted on the body between the first and second connector tabs for receiving at least one optical cable;

wherein the fastener is disposed on the second connector tab for facilitating manual disengagement of the notch from the edge of the second mounting flange; and wherein the second connector tab comprises:

a resilient camming portion for engaging the second mounting flange to displace the second connector tab during insertion of the module prior to engagement of the notch with the second mounting flange;

a manually engaging portion for displacing the second connector tab to disengage the notch from the second mounting flange during extraction of the module; and a stepped portion between the camming portion and the manually engaging portion, whereby the notch is formed between the stepped portion and the manually engaging portion.

5. The module according to claim 1, wherein the access port comprises an array of optical connector ports for connecting a plurality of optical cable connectors along coupling axes.

6. The module according to claim 5, wherein the coupling axes are at an acute angle to the plane containing the first and second mounting flanges, and disposed non-parallel to a longitudinal axis of the body.

7. The module according to claim 1, wherein the body includes a lip extending from one side thereof for engaging a groove provided in the second mounting flange.

8. The module according to claim 1, wherein the body comprises a main portion and a cover; and wherein the first and second connector tabs are integrally formed with the main portion.

9. An optical fiber distribution rack comprising:

a housing for supporting optical fiber management systems;

first and second mounting flanges, each defining an edge and an outside surface on opposite sides of an open slot disposed in the housing; and a module comprising:

a body for enclosing optical components;

a faceplate comprising first and second connector tabs disposed on opposite sides of the body for engaging the first and second mounting flanges, respectively, the first connector tab abutting against the outside surface of the first mounting flange, the second connector tab including a notch for engaging the edge of the second mounting flange, whereby the body is suspended in the rack at an acute angle to a plane containing the first and second mounting flanges;

a fastener manually engageable from outside of the rack disposed on the first or the second connector tab for connecting the module to and disconnecting the module from the first or the second mounting flange, respectively, with one hand; and an access port mounted on the body between the first and second connector tabs for receiving at least one optical cable.

10. The rack according to claim 9, wherein the first and second mounting flanges are mounted on a frame, which is slideable relative to the housing.

11. The rack according to claim 10, wherein the frame is slideable relative to a tray, which is slideable relative to the housing.

12. An optical fiber distribution rack comprising:

a housing for supporting optical fiber management systems;

first and second mounting flanges on opposite sides of an open slot disposed in the housing; and a module comprising:

a body for enclosing optical components;

a faceplate comprising first and second connector tabs disposed on opposite sides of the body for engaging the first and second mounting flanges, respectively, the first connector tab abutting against the first mounting flange, the second connector tab including a notch for engaging the second mounting flange, whereby the body is suspended in the rack at an acute angle to a plane containing the first and second mounting flanges;

a fastener disposed on the first or the second connector tab for connecting the module to and disconnecting the module from the first or the second mounting flange, respectively; and an access port mounted on the body between the first and second connector tabs for receiving at least one optical cable;

wherein the body includes a lip extending from one side thereof for engaging a groove provided in the second mounting flange.

13. The module according to claim 9, wherein the fastener is disposed on the first connector tab.

14. The module according to claim 13, wherein the second connector tab includes first and second planar sections defining an acute angle therebetween, whereby the notch is formed at a joint between the first and second planar sections.

15. The module according to claim 9, wherein the fastener is disposed on the second connector tab for facilitating manual disengagement of the notch from the edge of the second mounting flange.

16. The module according to claim 15, wherein the second connector tab comprises:
- a resilient camming portion for engaging the second mounting flange to displace the second connector tab during insertion of the module prior to engagement of the notch with the second mounting flange;
- a manually engaging portion for displacing the second connector tab to disengage the notch from the second mounting flange during extraction of the module; and
- a stepped portion between the camming portion and the manually engaging portion, whereby the notch is formed between the stepped portion and the manually engaging portion.

17. The module according to claim 9, wherein the access port comprises an array of optical connector ports for connecting a plurality of optical cable connectors along coupling axes.

18. The module according to claim 17, wherein the coupling axes are at an acute angle to the plane containing the first and second mounting flanges, and disposed non-parallel to a longitudinal axis of the body.

19. The module according to claim 9, wherein the body comprises a main portion and a cover; and wherein the first and second connector tabs are integrally formed with the main portion.

* * * * *